| United States Patent [19] | [11] Patent Number: 4,476,177 |
| Mizuno et al. | [45] Date of Patent: Oct. 9, 1984 |

[54] MAGNETIC TAPE HAVING A LEADER TAPE

[75] Inventors: Chiaki Mizuno; Goro Akashi, both of Kanagawa, Japan

[73] Assignee: Fuji Photo Film Co., Ltd., Kanagawa, Japan

[21] Appl. No.: 313,150

[22] Filed: Oct. 20, 1981

[30] Foreign Application Priority Data

Oct. 20, 1980 [JP] Japan ................................. 55-146736

[51] Int. Cl.³ ............................ B32B 5/16; G11B 5/78
[52] U.S. Cl. .................................. 428/206; 252/62.54; 360/134; 360/135; 360/136; 427/128; 428/327; 428/334; 428/335; 428/336; 428/694; 428/900
[58] Field of Search .............. 428/694, 692, 327, 900, 428/206, 207, 413, 423.7, 423.1, 474.4, 475.2, 334–336; 427/128; 252/62.54; 360/134–136; 352/235

[56] References Cited

U.S. PATENT DOCUMENTS

| 4,038,453 | 7/1977 | Loran | 428/325 |
| 4,104,436 | 8/1978 | Suzuki | 428/323 |
| 4,146,031 | 3/1979 | Fujiyama | 428/328 |
| 4,397,911 | 8/1983 | Akashi | 428/900 |

*Primary Examiner*—Ellis P. Robinson
*Attorney, Agent, or Firm*—Sughrue, Mion, Zinn, Macpeak & Seas

[57] ABSTRACT

A magnetic tape having on at least one end thereof a leader tape that comprises a base one or both sides of which are coated with a cleaning layer. The cleaning layer contains a binder and a particulate organic polymer having a size of 0.1 to 20$\mu$, and the leader tape has a light transmittance of 40 to 95%.

8 Claims, No Drawings

MAGNETIC TAPE HAVING A LEADER TAPE

FIELD OF THE INVENTION

This invention relates to a magnetic tape having a leader tape, more particularly, to a magnetic tape having a cleaning leader tape capable of cleaning the magnetic head of a magnetic recording apparatus.

BACKGROUND OF THE INVENTION

The record/reproduce head, as well as the guide poles and rollers in the travelling path of a "magnetic recording apparatus" in service such as an audio cassette recorder or video recorder are cleaned by a leader tape joined to the end of the magnetic tape. The cleaning layer of the conventional leader tape is made by spreading an inorganic pigment such as alumina ($Al_2O_3$), silicon carbide (SiC), chromium oxide ($Cr_2O_3$), titanium oxide (TiO), and red oxide (alpha-$Fe_2O_3$) on a base together with a binder. The cleaning layer obtained has adequate cleaning ability but since its polishing effect is too great, the head or guide poles are often damaged by abrasion, and so is the blade of a tape slitter or tape splicer.

To prevent these defects, a method has been proposed to provide the base with a matted surface by sand blasing rather than by a polishing agent (see Japanese Utility Model Publication No. 42726/74). However, the surface of the base cannot be roughened beyond a certain extent by this method, and very often, the breaking strength of the base is decreased. A leader tape is known that comprises a base having formed thereon a cleaning layer. The cleaning layer is comprised of a particulate inorganic pigment of a size of 0.002 to 4$\mu$ and held by a known binder (see Japanese Patent Publication No. 7631/80). This leader tape has great cleaning effect but the hard inorganic pigment particles sometimes damage the head surface when they polish the head, and the resulting scars in turn damage the magnetic tape reducing tape sensitivity and S/N ratio.

SUMMARY OF THE INVENTION

Therefore, one object of this invention is to provide a magnetic tape having a leader tape with high cleaning effect.

Another object of the invention is to provide a magnetic tape having a leader tape with high abrasion resistance.

These objects of this invention can be achieved by a magnetic tape having on at least one end thereof a leader tape having a light transmittance of 40 to 95%, preferably 70 to 95%, that comprises a base, coated on one or both sides with a cleaning layer containing a binder and a particulate organic polymer having a size of 0.1 to 20$\mu$.

DETAILED DESCRIPTION OF THE INVENTION

The particulate organic polymers used in this invention includes a cellulose powder and resin particles. An example of the cellulose powder is "KC Floc" of The Kokusaku Pulp Industry Co., Ltd., and examples of the resin particles are polystyrene, polyethylene, polypropylene, polyamide, polyester, phenolic resin, urea resin, melamine resin, epoxy resin and phenoxy resin. The size of these particulate organic polymers is in the range of from 0.1 to 20$\mu$, and those having a maximum size of 10$\mu$ and an average size of 2.5$\mu$ are preferred.

To be held in position on the base, the particulate organic polymer is mixed with a binder such as a vinyl chloride/vinyl acetate resin, vinylidene chloride resin, metacrylic resin, nitrocellulose, water-soluble polymer (e.g., polyvinyl alcohol) or polyethylene latex. The mixing ratio of the particulate organic polymer and the binder is from 1/5 to 3/1, preferably from 1/3 to 1/1 by weight. The light transmittance of the cleaning layer can be adjusted by changing the amount of the organic polymer particles based on a calibration curve. The resulting mixture is spread on the whole or part of one or both sides of the base. The light transmittance can be increased by 10 to 30% by spreading the mixture in such a manner that the particles of the organic polymer form islands each having a diameter of 5 to 20$\mu$ and spaced by a distance of 5 to 20$\mu$, compared to uniform dispersion of the particles in the clearning layer. This means the use of the particulate organic polymer achieves easy control of the light transmittance. Any solvent can be used to spread the mixture so long as it does not dissolve the particulate organic polymer. For example, a mixture of methyl ethyl ketone and toluene is used. For the type of base (5 to 35$\mu$ thick), a binder and other additives that can be used in this invention, see Japanese Patent Application (OPI) No. 108804/77 (the symbol OPI means an unexamined published Japanese patent application).

The magnetic tape according to this invention has a leader tape having the following characteristics:

(1) It has superior ability to clean not only the magnetic head but also the guide poles, capstans and pinch rollers;

(2) It does not damage the surface of the magnetic head as it is cleaning;

(3) Its cleaning effect is not reduced upon repeated use; and (4) Its light transmittance is high and easily controllable, so it is suitable for use in a magnetic recording apparatus which detects the end of the magnetic tape with a phototube.

This invention is now described in greater detail by reference to the following examples which are given here for illustrative purposes only and are by no means intended to limit the scope of the invention.

EXAMPLE 1

A dispersion of polyethylene particles (av. size=2.5$\mu$), vinyl chloride-vinyl acetate copolymer (7:3) of a polymerization degree of 400 and an epoxy resin was spread on a polyethylene terephthalate film 20$\mu$ thick, and dried to form a cleaning layer 20$\mu$ thick. The resulting roll was slit into leader tape samples 3.81 mm wide and 1 m long. Each tape sample was joined to both ends of the magnetic tape with an adhesive tape and caused to run in an audio cassette tape recorder in record and reproduce modes. The number of tape runs necessary for removing the dirt on the magnetic head was checked. The smaller the number of tape runs, the greater the cleaning effect of the tape samples. The damage formed on the head surface after a given number of runs was also checked.

| Sample No. | Amount of Polyethylene Powder | Amount of Binder | No. of Tape Runs | Damage to Head | Cleaning Layer Shed | Light Transmittance (%) |
|---|---|---|---|---|---|---|
| 1 | 100 | 30 | 2 | Not obserbed | Obserbed | 35 |
| 2 | 100 | 50 | " | Not obserbed | Slightly obserbed | 40 |
| 3 | 100 | 100 | " | Not obserbed | Not obserbed | 45 |
| 4 | 100 | 200 | " | Not obserbed | Not obserbed | 55 |
| 5 | 100 | 300 | " | Not obserbed | Not obserbed | 65 |
| 6 | 100 | 400 | 3 | Not obserbed | Not obserbed | 70 |
| 7 | 100 | 500 | 4 | Not obserbed | Not obserbed | 75 |

EXAMPLE 2

The procedure of Example 1 was repeated except that the polyethylene particles were replaced by the particulate organic polymers indicated in the following table. The dry thickness of the cleaning layer was $8\mu$, and the weight ratio of the organic polymers to binder was 1:2. The results of performance test with the cleaning tape samples are shown in the following table.

| Sample No. | Organic Polymer | Number of Tape Runs | Damage to Head | Cleaning Layer Shed | Light Transmittance (%) |
|---|---|---|---|---|---|
| 8 | Polyethylene | 2 | Not obserbed | Not obserbed | 55 |
| 9 | Polypropylene | " | Not obserbed | Not obserbed | 55 |
| 10 | Polyamide | " | Not obserbed | Not obserbed | 55 |
| 11 | Polyester | " | Not obserbed | Not obserbed | 50 |
| 12 | Cellulose | " | Not obserbed | Not obserbed | 45 |

As shown in the table, the cleaning tape samples according to this invention had the same performance even if the type of particulate organic polymer was changed.

EXAMPLE 3

The procedure of Example 2 was repeated except that the particulate organic polymer was particulate polyethylene which was dispersed in the binder either uniformly or unevenly to form islands having the diameters indicated in the following table. The results of performance test with the cleaning type samples are shown in the following table.

| Sample No. | Organic Polymer | Dispersion of Organic Polymer | Diameter of Islands ($\mu$) | Distance between Islands | Light-Transmittance (%) |
|---|---|---|---|---|---|
| 13 | Polyethylene | Uniform | — | — | 55 |
| 14 | " | Islands | 5 | 5 | 67 |
| 15 | " | " | 7 | 10 | 75 |
| 16 | " | " | 15 | 10 | 70 |
| 17 | " | " | 20 | 20 | 80 |

As shown in the table, the formation of islands of the particulate organic polymer in the cleaning layer was effective in increasing the light transmittance of the layer.

EXAMPLE 4

A reference sample was prepared by repeating the procedure of Example 1 except that the polyethylene powder was replaced by titanium oxide ($TiO_2$). Sample No. 4 of Example 1 and the reference sample were joined to cassette tapes, respectively, and a caused to run in an audio cassette recorder twice to see if any damage had occurred to the surface of the magnetic head. A razor blade was held in contact with the surface of each leader tape sample at the right angle while it was caused to run a distance of 100 m at a rate of 1.5 m/sec, and the wear of the blade was checked. The results are shown in the following table.

| Sample No. | Damage to Head | Wear of Blade ($\mu$) |
|---|---|---|
| No. 4 of Example 1 | Not obserbed | 3 |
| Reference (containing inorganic pigment) | Obserbed | 20 |

While the invention has been described in detail and with reference to specific embodiments thereof, it will be apparent to one skilled in the art that various changes and modifications can be made therein without departing from the spirit and scope thereof

What is claimed is:

1. A tape comprising:
    a magnetic recording tape portion; and
    a leader tape portion connected at one end thereof, said leader tape comprising a base, and a cleaning layer coated on one side of said base, said cleaning layer consisting essentially of a binder and a particulate organic polymer having a size of 0.1 to $10\mu$, wherein said particulate organic polymer and said binder are mixed in a ratio of from 1/5 to 3/1 by weight, said leader tape portion having a light transmittance of 40 to 95%.

2. A tape as claimed in claim 1, wherein said ratio is from 1/3 to 1/1 by weight.

3. A tape as claimed in claim 1, wherein said binder and particulate organic polymer are spread in such a manner that particles of said organic polymer form islands each having a diameter of 5 to $20\mu$ spaced by a distance of 5 to $20\mu$.

4. A tape as claimed in claim 1, where said particulate organic polymer is a cellulose powder, or resin particles selected from the group consisting of polystyrene, polyethylene, polypropylene, polyamide, polyester, phenolic resin, urea resin, melamine resin, epoxy resin or phenoxy resin.

5. A tape as claimed in claim 1, wherein said particulate organic polymers have a maximum size of $10\mu$ and an average size of $2.5\mu$.

6. A tape as claimed in claim 1, wherein said cleaning layer is coated on both sides of said leader tape.

7. A tape as claimed in claim 1, wherein said leader tape is connected at both ends of said magnetic recording tape portion.

8. A tape as claimed in claim 1 wherein said base has a thickness ranging from 5 to $35\mu$.

* * * * *